(12) United States Patent
Gilardi et al.

(10) Patent No.: US 7,693,356 B2
(45) Date of Patent: Apr. 6, 2010

(54) LITHIUM NIOBATE OPTICAL MODULATOR

(75) Inventors: Giovanni Gilardi, Olginate (IT); Paolo Milanese, Olevano Di Lomellina (IT); Simone Pensa, Albano Vercelles (IT)

(73) Assignee: Oclaro (North America), Inc., Fremont, CA (US)

( * ) Notice: Subject to any disclaimer, the term of this patent is extended or adjusted under 35 U.S.C. 154(b) by 0 days.

(21) Appl. No.: 12/208,696

(22) Filed: Sep. 11, 2008

(65) Prior Publication Data

US 2009/0067770 A1  Mar. 12, 2009

Related U.S. Application Data

(62) Division of application No. 10/527,607, filed as application No. PCT/EP03/10093 on Sep. 9, 2003, now Pat. No. 7,460,739.

(30) Foreign Application Priority Data

Sep. 13, 2002 (EP) ................... 02078774
Mar. 12, 2003 (EP) ................... 03075716

(51) Int. Cl.
*G02F 1/035* (2006.01)
*G02F 1/03* (2006.01)

(52) U.S. Cl. ............... 385/2; 385/3; 385/8; 385/129; 385/130; 359/245

(58) Field of Classification Search ............. 385/2–3, 385/8, 129–130; 359/237, 315, 254, 245
See application file for complete search history.

(56) References Cited

U.S. PATENT DOCUMENTS

| | | | | |
|---|---|---|---|---|
| 5,748,358 A | * | 5/1998 | Sugamata et al. | 359/245 |
| 6,198,855 B1 | * | 3/2001 | Hallemeier et al. | 385/2 |
| 6,760,493 B2 | * | 7/2004 | Pruneri et al. | 385/8 |
| 2002/0167711 A1 | * | 11/2002 | Nespola et al. | 359/245 |
| 2003/0002766 A1 | * | 1/2003 | Pruneri et al. | 385/2 |

* cited by examiner

*Primary Examiner*—Brian M. Healy
*Assistant Examiner*—Guy G Anderson
(74) *Attorney, Agent, or Firm*—Patterson & Sheridan, L.L.P.

(57) ABSTRACT

An optical modulator comprises a Z-cut lithium niobate substrate on which is formed a Mach-Zehnder interferometer having two generally parallel waveguides lying beneath a buffer layer of dielectric material. First and second ground electrodes and a hot electrode are disposed on the buffer layer, the first and second ground electrodes being spaced either side of the hot electrode, the hot electrode and the first ground electrode being proximate to at least apart of the respective waveguides. The electrode structure is unsymmetrical in that (a) the hot electrode and the first ground electrode each have a width substantially less than that of the second ground electrode and or (b) the spacing between the first ground and hot electrodes is different from the spacing between the second ground and hot electrodes. whereby a range of chirp values can be obtained. When the spacing between the first ground and hot electrodes is smaller than the spacing between the second ground and hot electrodes, and preferably the hot and first ground electrodes have a width not exceeding 15 .μm, the modulator is capable of operation at frequencies above 10 GHz, possibly up to around 40 GHz.

7 Claims, 10 Drawing Sheets

LITHIUM NIOBATE OPTICAL MODULATOR

CROSS-REFERENCE TO RELATED APPLICATIONS

This application is a divisional of U.S. patent application Ser. No. 10/527,607, filed Nov. 17, 2005, now U.S. Pat. No. 7,460,739 which is a 371 application of PCT/EP03/10093, filed Sep. 9, 2003, which claims priority to EP 03075716.5, filed Mar. 12, 2003, and EP 02078774.3, filed Sep. 13, 2002, each application is herein incorporated by reference.

BACKGROUND OF THE INVENTION

1. Field of the Invention

This invention relates to lithium niobate optical modulators. In particular, the invention relates to lithium niobate optical modulators with electrode structures enabling chirp parameters to be chosen and controlled; some forms of the invention also achieve operation at high frequencies (bit rates) of up to 40 GHz.

2. Background of the Related Art

As the demand for telecommunications services and bandwidth has boomed, the need for, and advantages of, external modulation in fibre-optic transmission systems has been firmly established. Lithium niobate is today one of the most important dielectric materials in the field of integrated optics, both for research and for technological applications. This importance is due to the strong correlation between the optical properties of the crystal, its refractive index, and the application of various kinds of external fields; namely electric fields (electro-optic effect), sound waves (acousto-optic effect) and electromagnetic waves. Lithium niobate external modulators provide both the required bandwidth and a means for mining the effects of dispersion that limit system performance.

SUMMARY OF THE INVENTION

Almost all lithium niobate optical modulators are travelling wave devices, in which the optical waveguide comprises a Mach-Zehnder Interferometer (MZI). High speed, broad bandwidth optical modulators are made by constructing a particular electrode structure on the buffer layer of the MZI modulator, which prevents light propagating through the waveguide path from being absorbed by the electrode metal. MZI modulators usually operate with a push-pull electrode structure, so that fields of opposite polarity operate on each arm of the waveguide. These fields serve to change the index of the electro-optic lithium niobate, which in turn alters the phase of the light travelling in each waveguide, and thus allows operation of the interferometer. The optical phase or amplitude modulation results from an interaction between the optical wave in the optical waveguide and the microwave wave guided by the electrode structure. Meantime, however, the refractive index of the lithium niobate also changes in response to exposure to light, including the light being modulated, producing changes that can be interpreted as phase modulation or as a change of frequency spectrum within the digital pulses, and which are known as "chirp". In an idealised system operating with perfectly monochromatic light, chirp would be a defect to be minimised, but in a real system with a finite range of optical wavelengths, it is possible to exploit chirp to counter chromatic dispersion occurring elsewhere in the system, and so it is desirable to be able to make modulators with pre-selected chirp values, preferably over a substantial range.

Lithium niobate MZI devices have the potential for very broadband operation, but they are limited by, inter alia, mismatches between optical and microwave effective refractive indices (and hence mismatches between the velocities of the electrical and optical signals), electrode electrical losses, electrode impedance and drive voltage. Specifically, a velocity mismatch between the velocities of the electrical and optical signals together with electrical losses strongly curb modulator electro-optical response; high electrode impedance is needed to prevent reflections when the modulator is connected to a signal electrical driver; and low driving voltages are a prerequisite. Introducing a very thin dielectric layer between the MZI structure and the electrodes can provide velocity matching between the electrical and optical fields, low electrical losses and high impedances, but requires higher driving voltages. Modulators made accordingly based on both X-cut and Z-cut lithium niobate substrates perform well up to 10 GHz (the electro-optic effect in lithium niobate is anisotropic and highest in the Z direction of the crystal's unit cell; to maximise the electric field in that direction and so the depth of modulation, waveguides in a Z-cut surface will normally be located directly below electrodes, whereas those in an X-cut surface will normally be located in the gap between two electrodes). For operation at frequencies in excess of 10 GHz using the same driving voltage and microwave refractive index values, Z-cut lithium niobate substrates enable lower electrical losses and higher impedances.

Typical electrode structures used for Z-cut lithium niobate MZI modulators include coplanar strip structures, as shown in FIG. 1, having respective electrodes 1, 3 disposed on the buffer layer 5 directly above each of two parallel waveguides 7, 9 forming the MZI and having equal widths approximately the same as those of the waveguides. Such structures provide high impedance, but also high electrical losses. Asymmetric coplanar strip electrode structures, as shown in FIG. 2, are similar to the coplanar strip structures of FIG. 1 except that the ground electrode 3 is much wider than the hot electrode 1. These structures present problems with electrical-optical signal velocity matching, which may be overcome by use of very thick gold electrodes (>30 μm), though such thicknesses are difficult to obtain using standard processes. Such structures also cannot achieve very low electrical losses suitable for high frequency applications, and their structure does not permit easy electrical connections to be made within a package.

Coplanar waveguide structures, as shown in FIG. 3, are similar to asymmetric coplanar strip structures of FIG. 2 with a second wide ground electrode 4 spaced symmetrically on the other side of the narrow hot electrode 1. These structures can provide good electrical loss characteristics, but to achieve optical-microwave effective refractive index matching and high impedance requires an increase in buffer layer thickness which then requires higher driving voltages. One way to achieve optical-microwave effective refractive index matching and high impedance using a thinner buffer layer would be to use narrow ground electrodes. However, narrow electrodes suffer from very high electrical losses.

There remains a need for a Z-cut lithium niobate optical modulator design which is capable of operating at frequencies in excess of 10 GHz with matching optical and microwave effective refractive indices, low drive voltage and electrode electrical losses, and high electrode impedance; some forms of the present invention solve this problem, as well as providing choice of chirp values at frequencies at present in use.

According to the invention, there is provided an optical modulator comprising a Z-cut lithium niobate substrate on which is formed a Mach-Zehnder interferometer having two generally parallel waveguides lying beneath a buffer layer of dielectric material. First and second ground electrodes and a hot electrode are disposed on the buffer layer, the first and second ground electrodes being spaced either side of the hot electrode, the hot electrode and the first ground electrode being proximate to at least a part of the respective waveguides. The invention is characterized by an asymmetrical electrode structure in which (a) the hot electrode and the first ground electrode each have a width substantially less than that of the second ground electrode and/or
(b) the spacing between the first ground and hot electrodes is different from the spacing between the second ground and hot electrodes.

The hot electrode will normally have a width approximately equal to the width of the waveguide beneath it, and when option (a) applies, this is preferably also true of the first ground electrode; in this case, therefore, the widths of the hot electrode and the first ground electrode will usually be substantially equal and not normally. exceeding 15 μm. Preferably they will each have a width in the range 5-15 μm. The second ground electrode preferably has a width at least five times greater than that of the hot electrode (and usually the first ground electrode); more especially preferably at least ten times wider, in this context considered an "infinite" width.

By adjustment of the two spacings between the hot electrode and the respective ground electrode, and/or of the widths of the three electrodes, a useful range of chirp values can be obtained, as will be illustrated below.

By use of a smaller spacing between the first ground electrode and the hot electrode than between the second ground electrode and the hot electrode, and preferably a first ground electrode with a width not exceeding 15 μm, the inventors have been able to obtain a good match between the microwave and optical effective refractive indices, so maintaining low electrical losses and good impedance characteristics. This action does not affect the driving voltage since neither the buffer layer thickness nor the spacing between the first ground and hot electrodes are adversely changed. Furthermore, by appropriate selection of geometrical parameters, it remains possible to provide a modulator structure with a residual chirp value close to zero (as an absolute value, irrespective of sign; as is understood in the art, only the magnitude of the chirp value is significant, because its sign can be reversed by setting bias to chose operation on a part of the sinusoidal optical output intensity/driving voltage characteristic of the device that has negative or positive slope).

Preferably, the spacing between the first ground and hot electrodes is between 10 and 30 μm and the spacing between the second ground and hot electrodes is larger, between 20 and 80 μm.

Use of a (second) wide ground electrode in some preferred forms of the invention ensures low electrical loss, while the combination of this with a (first) narrow ground electrode ensures low driving voltage and high impedance. The narrow ground electrode further serves to reduce the microwave effective refractive index relative to the optical refractive index.

Preferably, the dielectric material comprises silicon dioxide with a thickness between 0:4 and 1.5 μm, and the electrodes comprise gold having a thickness between 15 and 50 μm; thicknesses up to 30 μm are easier to obtain with present electroplating techniques.

Additional features and advantages of the invention will be set forth in the detailed description which follows, and in part will be readily apparent to those skilled in the art from the description or recognized by practicing the invention as described in the written description and claims hereof, as well as the appended drawings. It is to be understood that both the foregoing description and the following detailed description are merely exemplary of the invention, and are intended to provide an overview or framework to understanding the nature and character of the invention as it is claimed.

BRIEF DESCRIPTION OF THE DRAWINGS

The accompanying drawings are included to provide a further understanding of the invention, and are incorporated in and constitute a part of this specification. The drawings illustrate one or more embodiments of the invention, and together with the description serve to explain the principles and operation of the invention.

DETAILED DESCRIPTION

Figure 4:
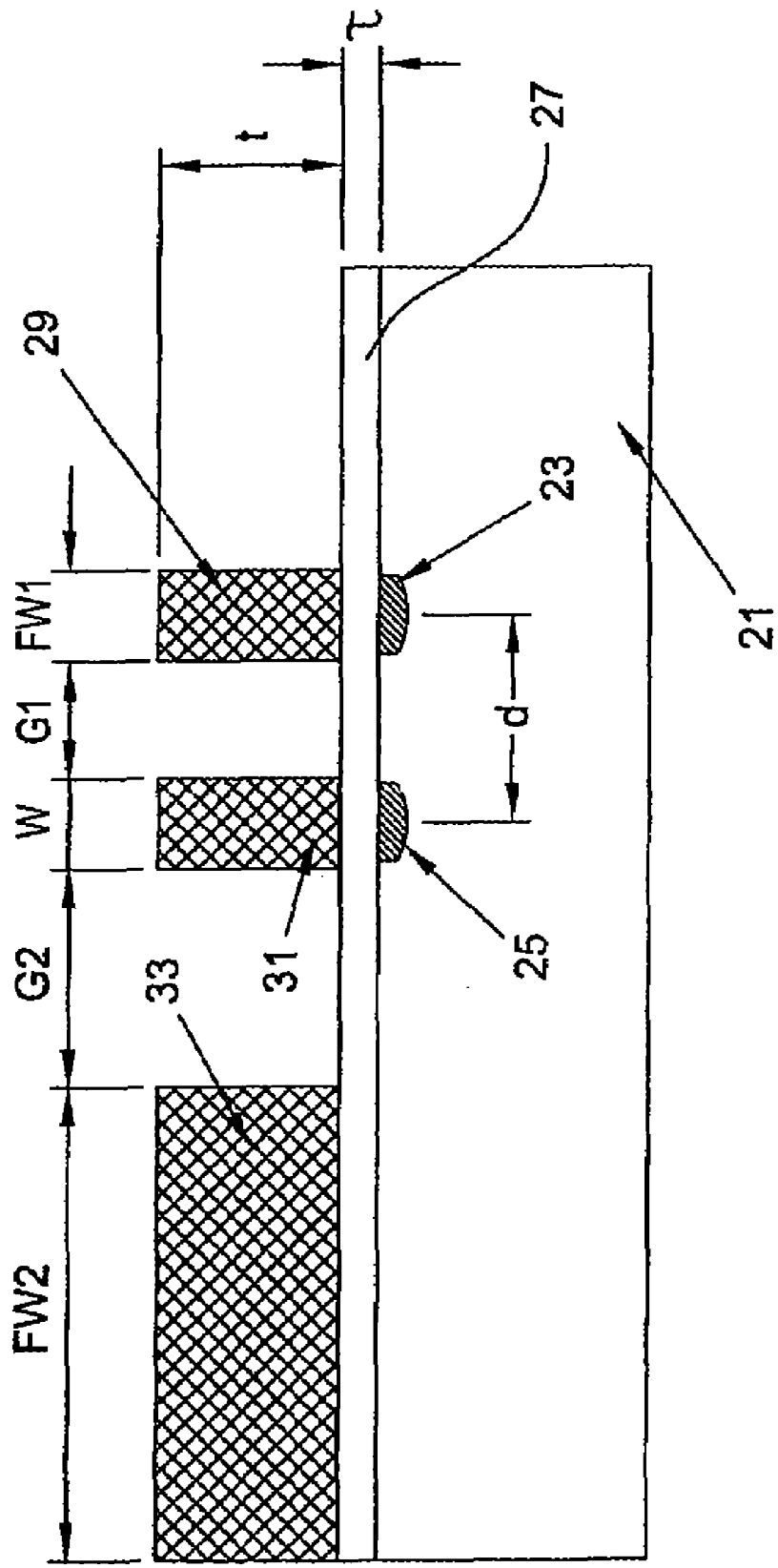
FIGS. 4 and 5 are section and plan views of a preferred modulator structure according to the invention.
Figure 5:
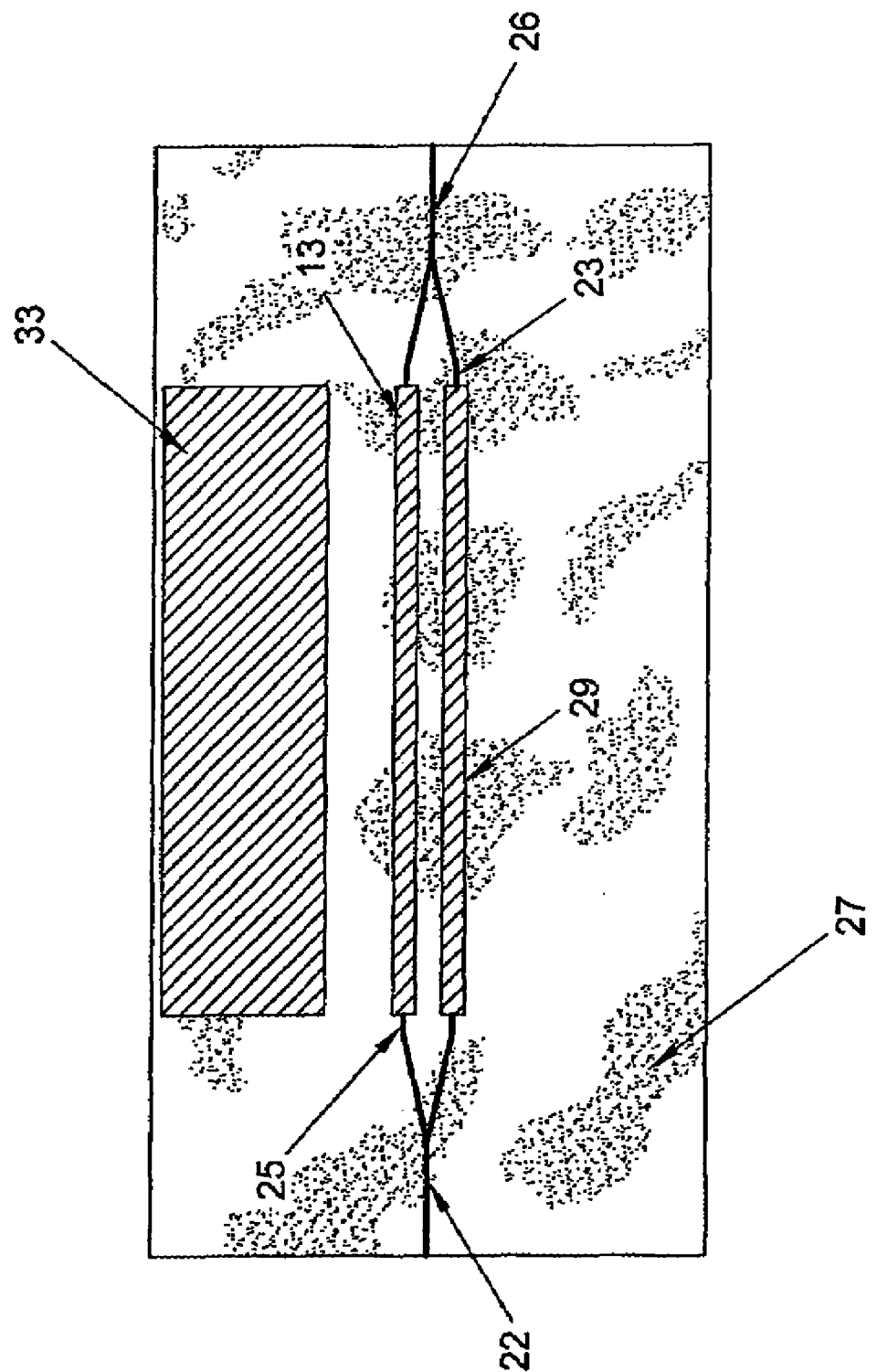

A first preferred asymmetric coplanar waveguide modulator structure according to the invention, shown in FIGS. 4 and 5, comprises a Z-cut lithium niobate substrate 21 with a thickness of around 500 μm presenting an optical MZI on its surface. The MZI comprises a mid section having two generally parallel waveguides 23, 25 which converge at either end into single input and output waveguides 22, 26. The parallel waveguides are formed in the plane of the surface of the substrate by a standard titanium diffusion process well known to those skilled in the art of modulator design. The axes of the parallel waveguides 23, 25 are 25 μm apart and they have a depth of around 6 μm and a width of around 10 μm A buffer layer 27 of silicon dioxide having a dielectric constant of around 4 and a thickness of 0.65 μm is grown by means of a conventional electron beam evaporation process directly on the surface of the lithium niobate substrate in which the waveguides 23, 25 are formed. Three parallel gold electrodes 29, 31, 33 are grown on the buffer layer 27 to a thickness of 27 μm. Two of the electrodes 29, 31 are disposed directly above the parallel waveguides 23, 25 with a width of around 7 μm. and a length extending to just short of the ends of the parallel sections of the waveguides 23, 25. The third electrode 33 is spaced 50 μm from the middle electrode 31 with a width of 150 μm and the same length as the other electrodes.

Figure 8:
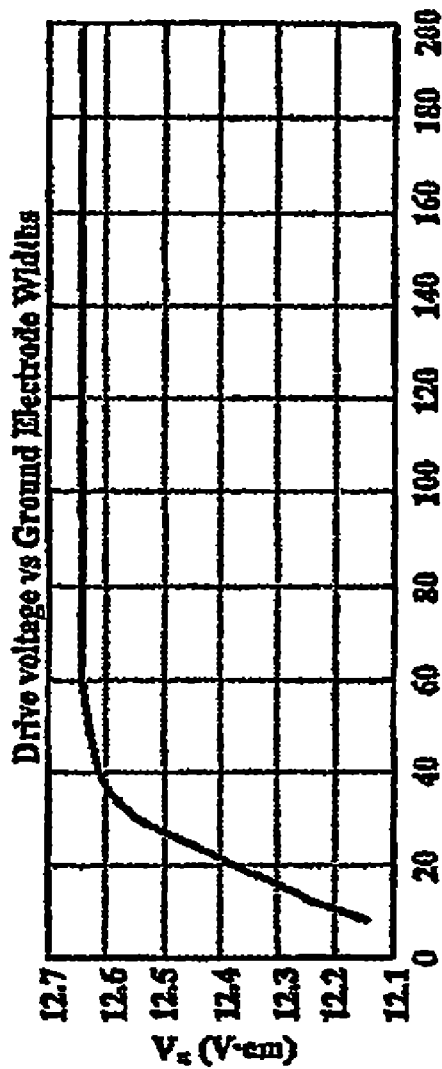
FIGS. 8 to 11 are graphs showing the dependence of drive voltage, electrical loss, microwave index and impedance against ground electrode widths.
Figure 9:
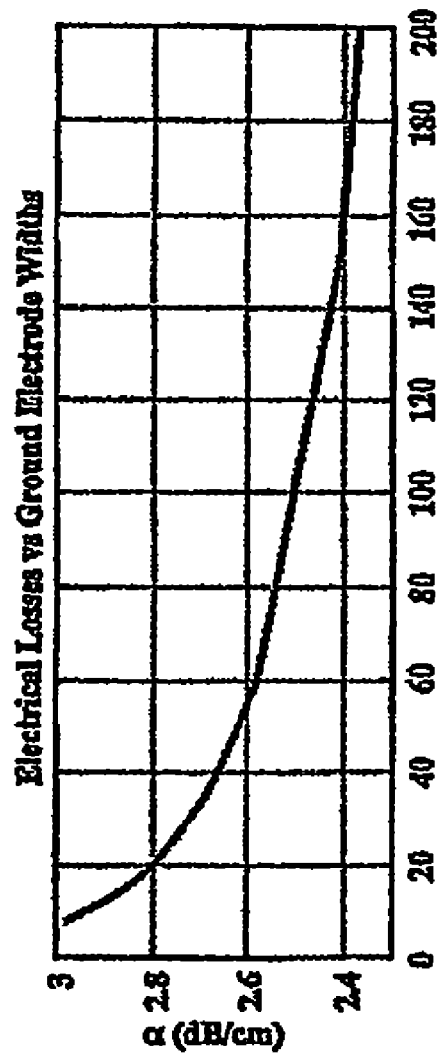
Figure 10:
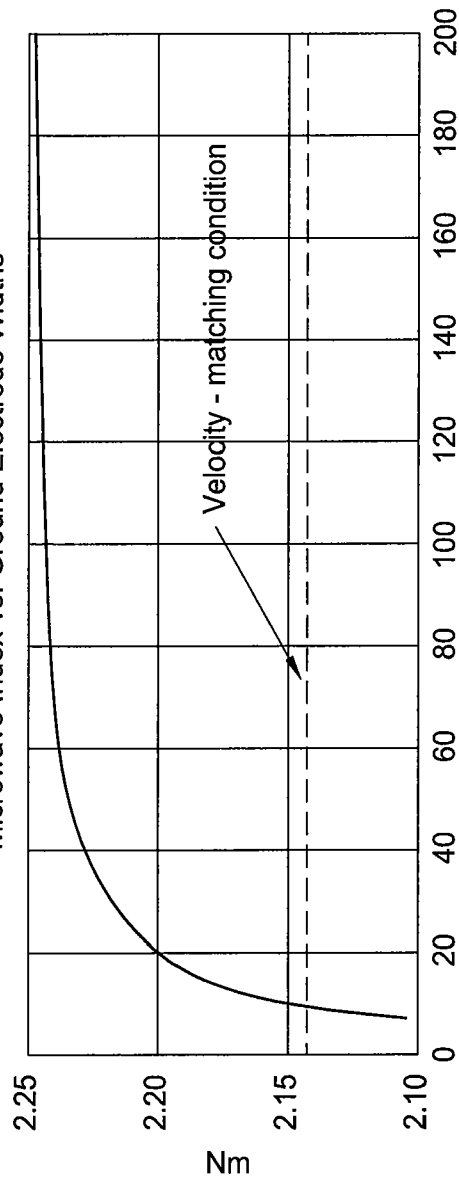
Figure 11:
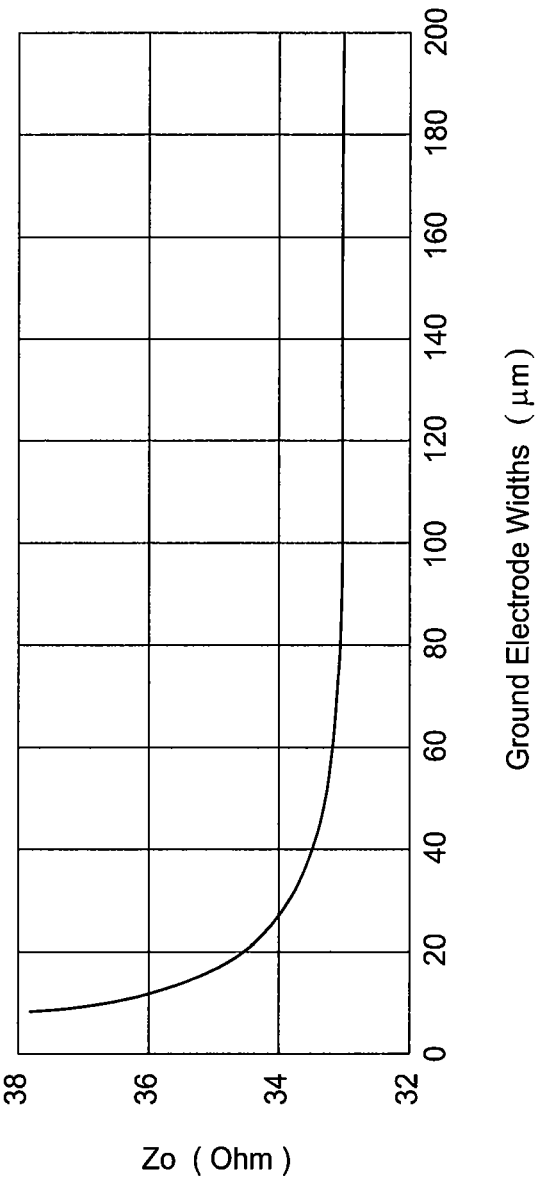

Using the middle electrode 31 as the hot electrode, the narrow electrode 29 to the side of the hot electrode as a first ground electrode and the wide electrode 33 on the other side of the hot electrode 31 as a second ground electrode, the asymmetric coplanar waveguide modulator structure described has a chirp (alpha parameter modulus) value of about 0.05 (as further discussed below) and functions well at frequencies up to and including 40 GHz. The narrow first ground electrode 29 ensures that driving voltages may be kept low while maintaining high impedance. FIG. 8 shows the effect of increasing ground electrode widths on drive voltage, and FIG. 11 shows the effect of increasing ground electrode widths on impedance for a conventional symmetric coplanar waveguide structure. The narrow first ground electrode 29 also serves to reduce the microwave effective refractive index, enabling it to be brought down to match the optical refractive index, while still widening the space G2 between the second ground electrode 33 and the hot electrode 31 to benefit from low electrical loss and high impedance. Thus, the buffer layer may be kept within parameters for maintaining low driving voltages. The effect of increasing ground electrode widths on the velocity matching parameter is demonstrated graphically in FIG. 10. The wide second ground electrode 33 on the other hand ensures low electrical loss, as demonstrated in FIG. 9; also such graphs are related to a conventional symmetric coplanar waveguide structure.

Figure 3:
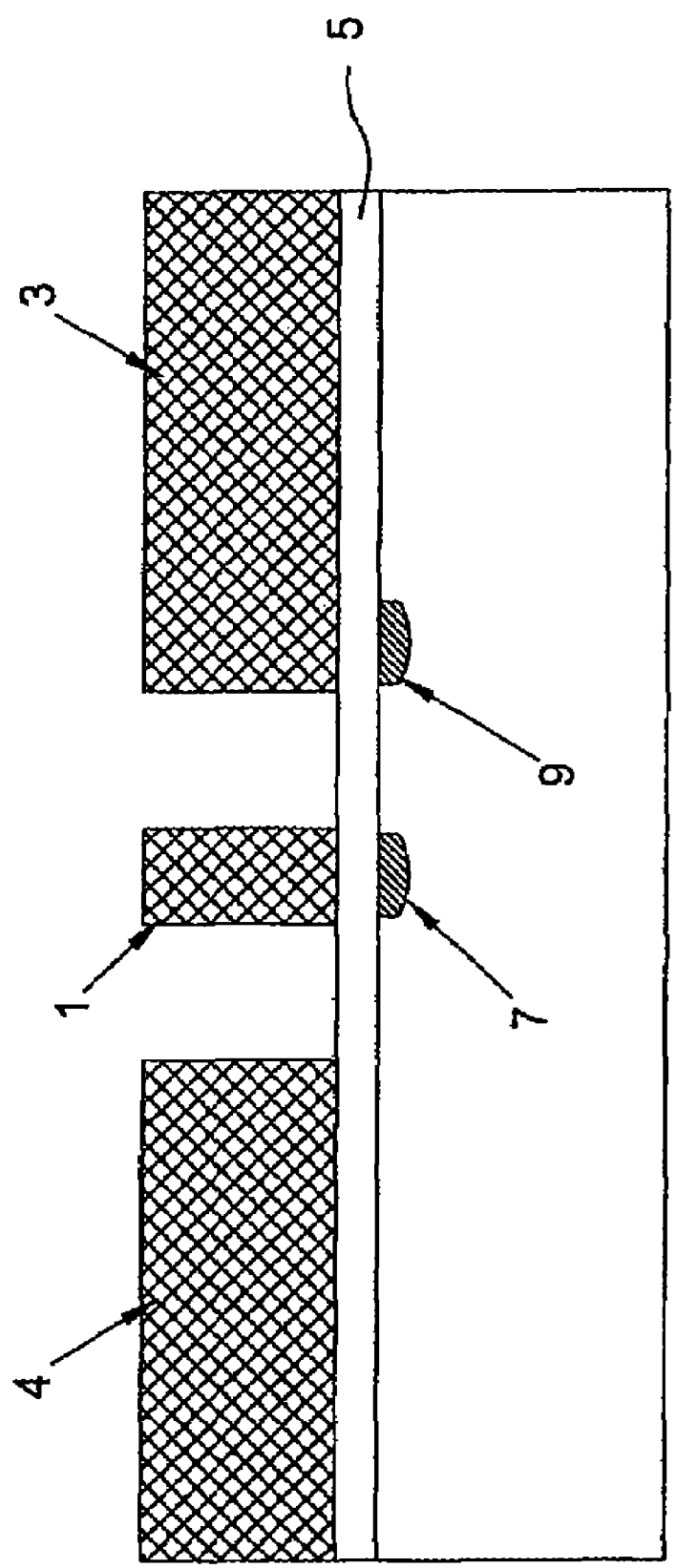

Table 1 provides a comparison between critical geometrical and performance parameters of the asymmetric coplanar waveguide modulator structure as shown in FIGS. 4 and 5 ("invention") and two coplanar waveguide modulator structures as shown in FIG. 3, one with wide ground electrodes (CPW "inf") and one with narrow ground electrodes (CPW "fin"):

TABLE 1

| | Parameter | | | | | |
|---|---|---|---|---|---|---|
| | W (μm) | G1 (μm) | G2 (μm) | FW1 (μm) | FW2 (μm) | t (μm) |
| Invention | 7 | 18 | 50 | 7 | Inf | 27 |
| CPW "inf" | 7 | 18 | 18 | Inf | Inf | 27 |
| CPW "fin" | 7 | 18 | 18 | 7 | 7 | 27 |

| | Parameter | | | | | |
|---|---|---|---|---|---|---|
| | τ (μm) | $N_m$ | $Z_0$ (Ω) | EL(dB/cm) at 40 GHz | Vπ*L (V*cm) | $|\alpha|$ (chirp parameter) |
| Invention | 0.65 | 2.15 | 50 | 2.45 | 11 | 0.05 |
| CPW "inf" | 0.65 | 2.21 | 34 | 2.5 | 11 | 0.66 |
| CPW "fin" | 0.65 | 2.11 | 41 | 3 | 10.7 | 0.32 | where the geometrical parameters are as shown in FIG. 4, $N_m$ is the microwave effective refractive index, $Z_0$ is the impedance, EL is the electrical loss figure, and VπL is the drive voltage*electrode length product.

As can be seen, CPW "inf" gives a high microwave effective refractive index figure (2.21), while CPW "fin" has large electrical losses (3 dB/cm). However, the structure according to the invention displays the advantageous electrical loss figure of CPW "inf" and the velocity matching characteristics of CPW "fin" with high impedance and the same drive voltage.

In external modulators, chirp arises from phase modulation superposed on the modulated optical signal due to unequal modulation applied to the respective arms of the interferometer. If the integrals of the corresponding electrical and optical fields for the two arms are not equal, a residual chirp arises. For X-cut modulators, the electrode structure is generally symmetrical with the optical waveguides positioned beneath the buffer layer but symmetrically between the electrodes so the relative driving voltages are the same. Provided there are no spurious effects, then no residual chirp is expected.

Figure 1:
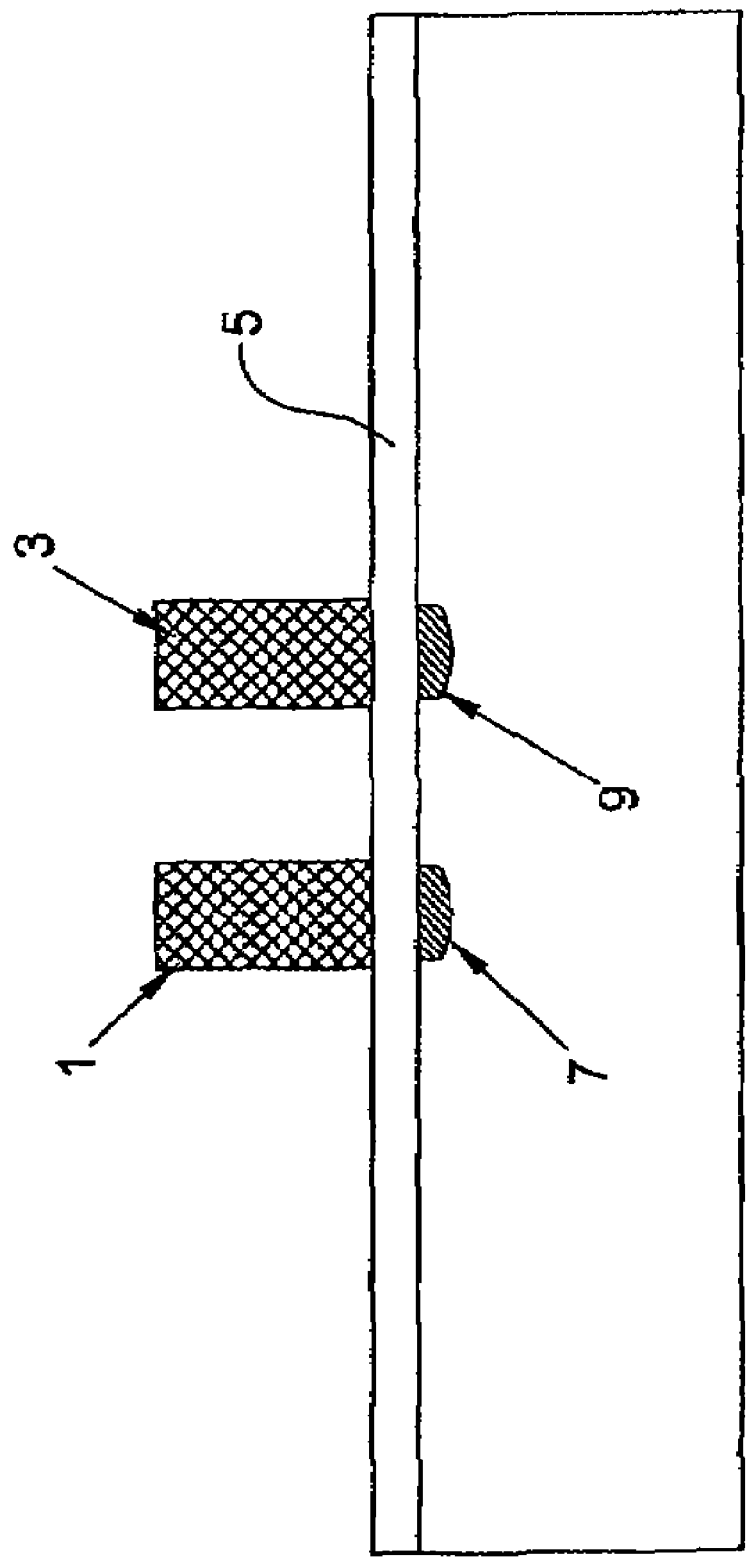
FIGS. 1 to 3 are sections through respective conventional coplanar strip, asymmetric coplanar strip and coplanar waveguide Z-cut modulator structures.
Figure 2:
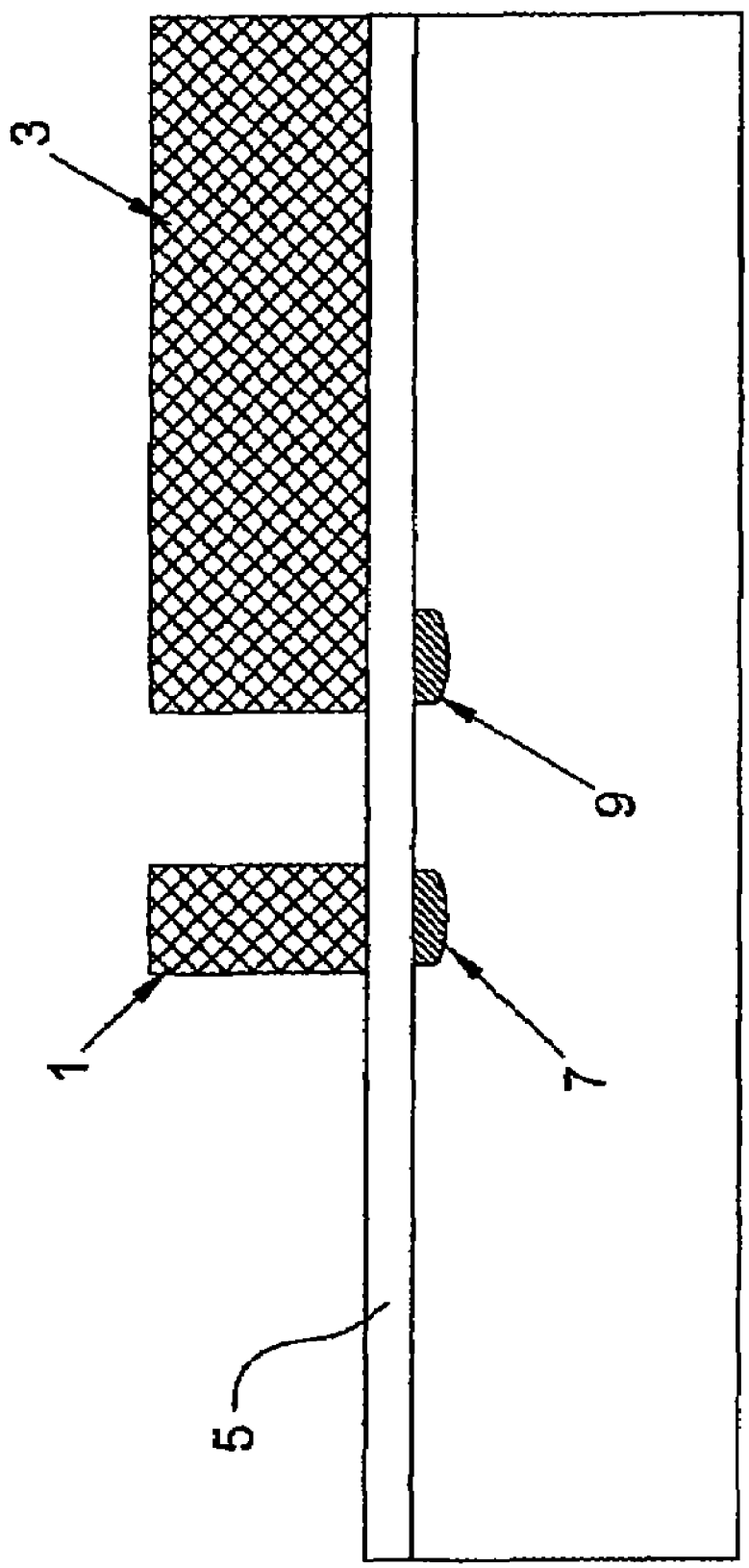
Figure 12:
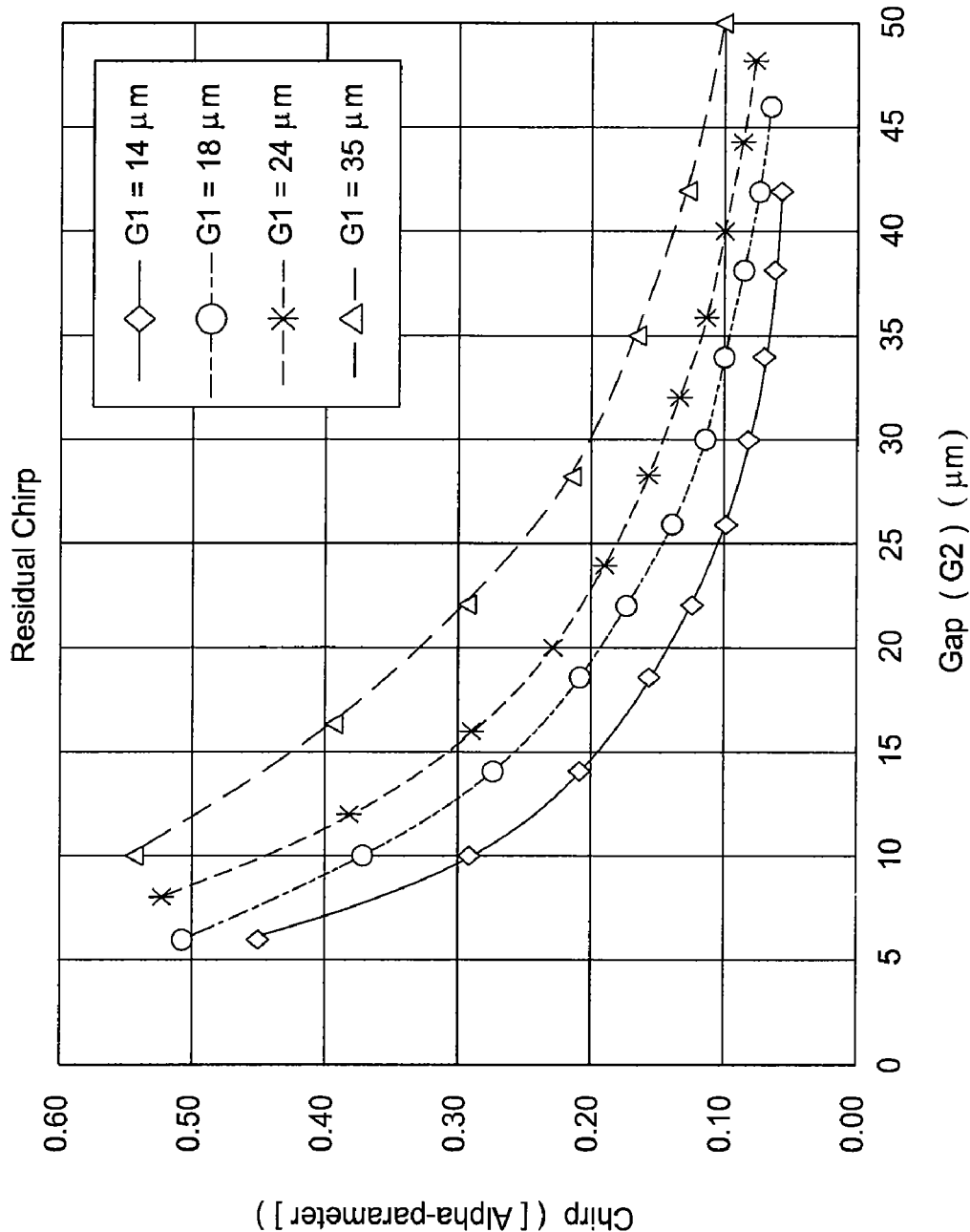
FIG. 12 is a graph showing the dependence of residual chirp on electrode spacing in the modulator of FIGS. 4 and 5.

For conventional Z-cut modulator structures such as that shown in FIG. 3, the combined electrical and optical structure cross sections are asymmetric (though the electrode structure and the optical structure, considered separately, are each symmetrical), with the optical waveguides placed beneath the hot electrode and one of the ground electrodes. Typical expected driving voltage*electrode length products for such a structure would be 10-15V*cm and 70-100V*cm for the respective arms, with the integral of the fields relating to the hot electrode arm being much higher than that relating to the other arm, leading to a fixed residual chirp. However, with the structure of the embodiment of the invention shown in FIGS. 4 and 5, the narrow ground electrode 29 over the waveguide 23 gives rise to driving voltages much closer to those exhibited by the coplanar strip structure of FIG. 1, typically of the order of 15-25V*cm for the hot electrode arm and 20-30V*cm for the ground electrode arm. Such close driving voltages lead to lower residual chirp than could be expected from the structures of FIGS. 3 and 2. FIG. 12 shows the effect that varying the spaces G1 and G2 between the hot electrode and the two ground electrodes in the structure of FIGS. 4 and 5 is calculated to have on residual chirp. For a fixed space G1, increasing G2 has the general effect of decreasing residual chirp. Conversely, for a fixed space G2, increasing G1 has the general effect of increasing residual chirp. In particular, by properly managing the geometrical parameters of the structure in FIG. 4, residual chirp values ($|\alpha|$) lower than 0.1 (usually considered to be a zero-chirp modulator) can be achieved.

In order to benefit fully from the respective advantages of the narrow and wide ground electrodes as described above requires that the wide electrode be at least ten times wider than the narrow electrode, and the narrow ground electrode to be preferably the same width as the hot electrode.

Table 2 below summarises a series of modulator designs, all in accordance with FIGS. 4 and 5, designed for operation at frequencies at present in operation (say 10 GHz) and for various different chirp values. Throughout the series, the hot electrode and first ground electrode each had a width of 8 and the second ground electrode at least 80 μm ("infinite"), and the electrodes were 10 mm long and about 20-25 μm thick.

In the table, d is the distance between the axes of the two waveguides, G1 the spacing between the hot electrode and the first ground electrode, G2 the spacing between the hot electrode and the second ground electrode, and .tau. the thickness of the buffer layer, all as shown in FIG. 4. Vυ is the drive voltage (which, since the electrode length is 10 mm, is numerically equal to the driving voltage *electrode length product). Chirp is tabulated as modulus (that is without its sign).

TABLE 2

| d | G1 | G2 | T | Vπ | Chirp ($|\alpha|$) |
|---|---|---|---|---|---|
| 22 | 14 | 6 | 0.55 | 9.63 | 0.45 |
| | | 10 | 0.55 | 9.78 | 0.29 |
| | | 14 | 0.55 | 9.85 | 0.21 |
| | | 18 | 0.55 | 10.03 | 0.16 |
| | | 26 | 0.6 | 10.45 | 0.10 |
| | | 34 | 0.6 | 10.50 | 0.07 |
| | | 42 | 0.6 | 10.53 | 0.05 |
| 26 | 18 | 6 | 0.55 | 9.80 | 0.51 |
| | | 10 | 0.55 | 10.10 | 0.37 |
| | | 14 | 0.55 | 10.20 | 0.27 |
| | | 22 | 0.55 | 10.40 | 0.17 |
| | | 30 | 0.65 | 11.60 | 0.12 |
| | | 38 | 0.65 | 11.13 | 0.09 |
| | | 46 | 0.65 | 11.13 | 0.06 |
| 32 | 24 | 8 | 0.6 | 10.53 | 0.52 |
| | | 12 | 0.6 | 10.68 | 0.38 |
| | | 16 | 0.6 | 10.95 | 0.29 |
| | | 24 | 0.7 | 11.75 | 0.19 |
| | | 32 | 0.75 | 12.10 | 0.14 |
| | | 40 | 0.75 | 12.10 | 0.10 |
| | | 48 | 0.75 | 12.15 | 0.07 |
| 43 | 35 | 10 | 0.7 | 11.83 | 0.54 |
| | | 16 | 0.7 | 12.08 | 0.39 |
| | | 22 | 0.7 | 12.20 | 0.29 |
| | | 28 | 0.7 | 12.33 | 0.22 |

TABLE 2-continued

| d | G1 | G2 | T | Vπ | Chirp (\|α\|) |
|---|----|----|---|----|---------------|
|   |    | 35 | 0.8 | 13.10 | 0.17 |
|   |    | 42 | 0.8 | 13.40 | 0.13 |
|   |    | 50 | 0.8 | 13.20 | 0.10 |

Figure 6:
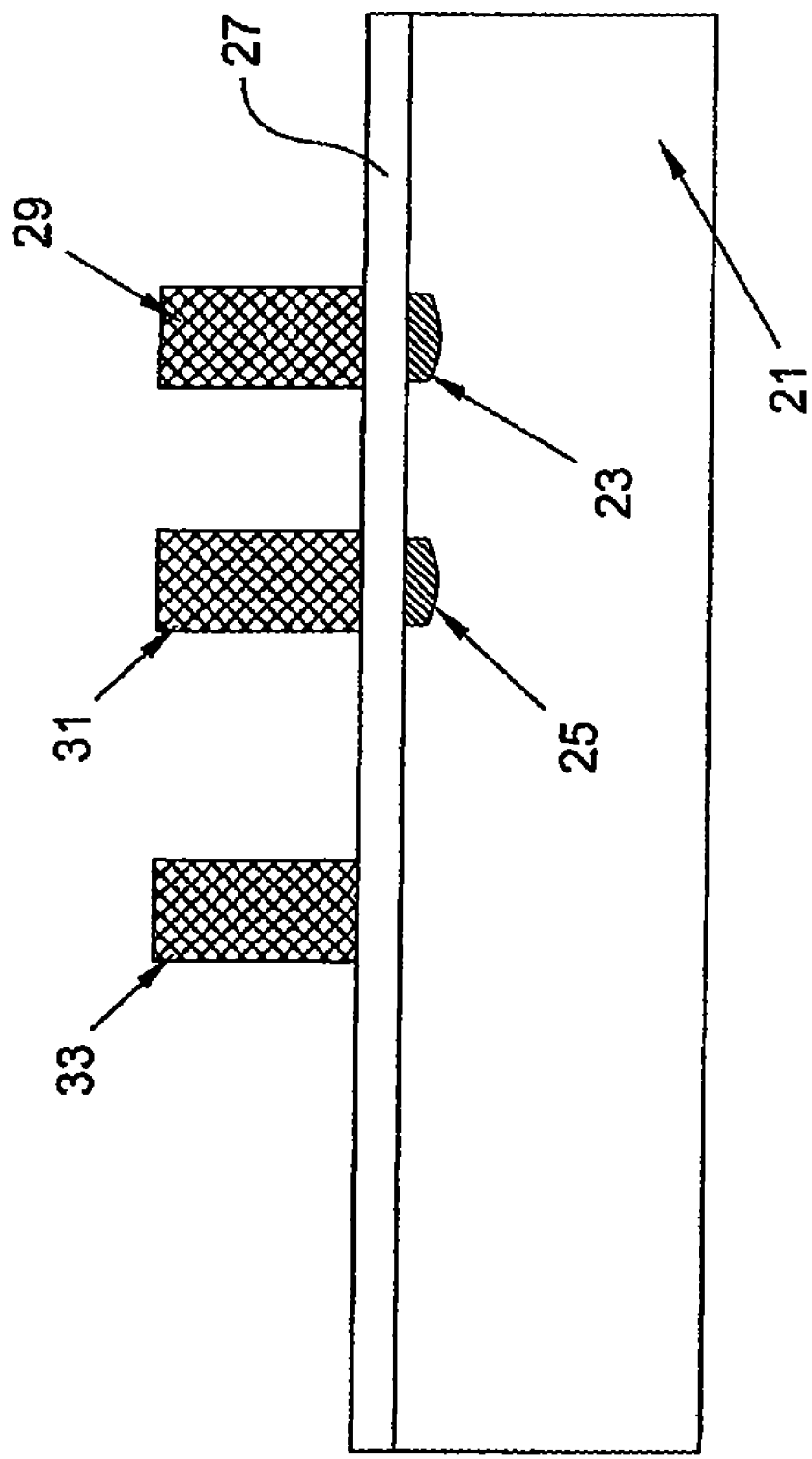
FIGS. 6 and 7 are section and plan views of a second modulator structure according to the invention.
Figure 7:
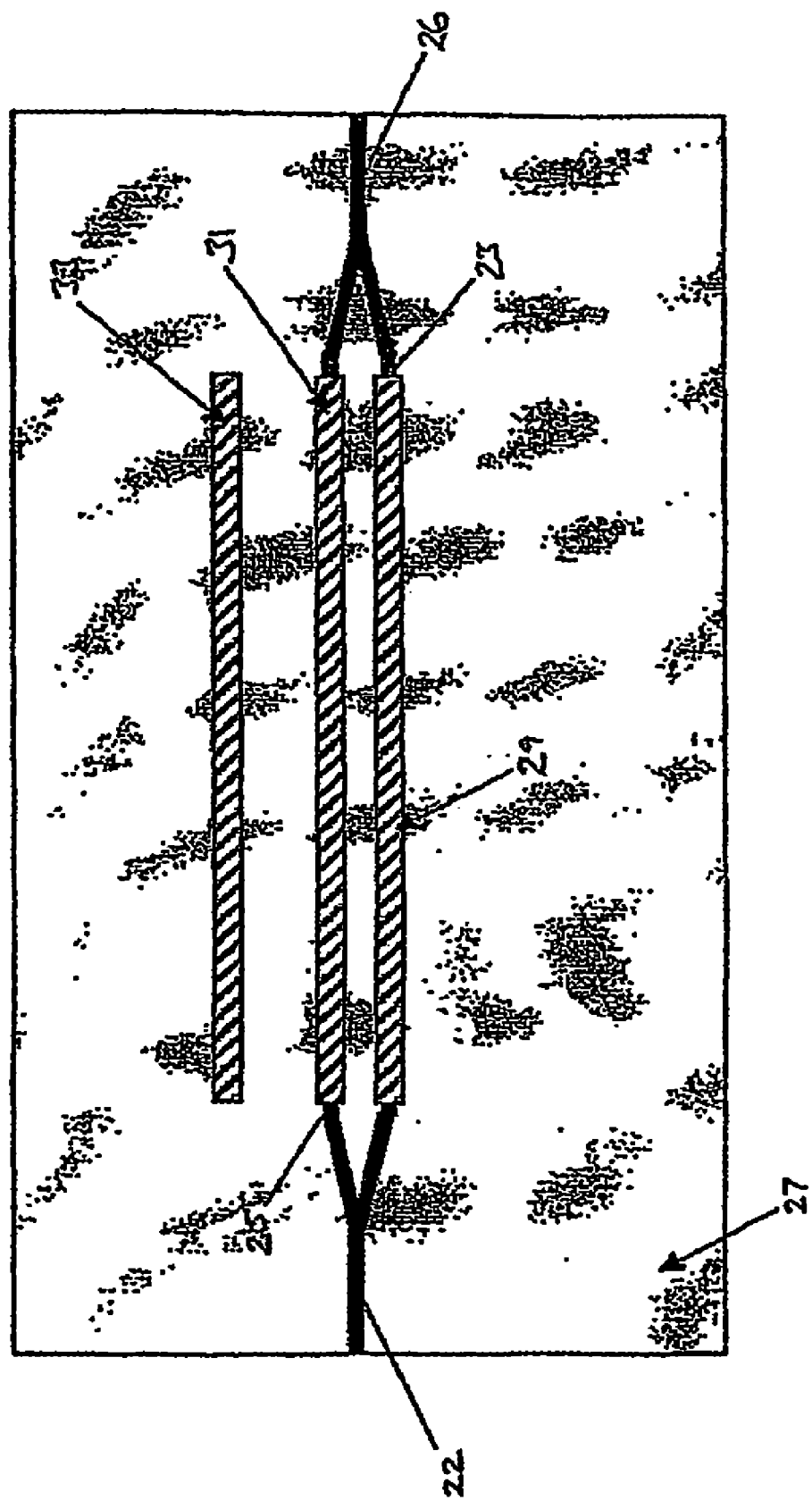

FIGS. 6 and 7 show an alternative asymmetric coplanar waveguide structure according to the invention in which the second ground electrode is the same width as the other two electrodes but the spacing of the electrodes is unequal. This structure achieves low driving voltages and high impedance, but it does suffer from higher electrical loss than the structure of FIGS. 4 and 5.

Any discussion of the background to the invention herein is included to explain the context of the invention. Where any document or information is referred to as "known" it is admitted only that it was known to at least one member of the public somewhere prior to the date of this application. Unless the content of the reference otherwise clearly indicates, no admission is made that such knowledge was available to the public or to experts in the art to which the invention relates in any particular country (whether a member-state of the PCT or not), nor that it was known or disclosed before the invention was made or prior to any claimed date. Further, no admission is made that any document or information forms part of the common general knowledge of the art either on a world-wide basis or in any country and it is not believed that any of it does so.

The invention claimed is:

1. An optical modulator comprising a Z-cut lithium niobate substrate on which is formed a Mach-Zehnder interferometer having two generally parallel waveguides lying beneath a buffer layer of dielectric material, and a first ground electrode, a second ground electrode, and a hot electrode disposed on the buffer layer, the first and second ground electrodes being spaced on either side of the hot electrode, the hot electrode and the first ground electrode being proximate to at least a part of the respective waveguides, wherein the hot electrode and the first ground electrode each have a width substantially less than that of the second ground electrode and wherein the spacing between the first ground and hot electrodes is different from the spacing between the second ground and hot electrodes.

2. The optical modulator according to claim 1, wherein the second ground electrode has a width at least five times greater than that of the hot electrode.

3. The optical modulator according to claim 1, wherein the second ground electrode has a width at least ten times greater than that of the hot electrode.

4. The optical modulator according to claim 1, wherein the hot electrode and the first ground electrode each have a width less than that of the second ground electrode and not exceeding 15 ÿm.

5. The optical modulator according to claim 4, in which the spacing between the first ground and hot electrodes is smaller than the spacing between the second ground and hot electrodes.

6. The optical modulator according to claim 1, wherein the hot electrode and the first ground electrode have widths approximately equal to the widths of the respective waveguides.

7. The optical modulator according to claim 1, wherein the hot electrode and the first ground electrode have substantially equal widths.

* * * * *

UNITED STATES PATENT AND TRADEMARK OFFICE
CERTIFICATE OF CORRECTION

PATENT NO. : 7,693,356 B2
APPLICATION NO. : 12/208696
DATED : April 6, 2010
INVENTOR(S) : Gilardi et al.

Page 1 of 1

It is certified that error appears in the above-identified patent and that said Letters Patent is hereby corrected as shown below:

In the Related U.S. Application Data (62):

Please delete "Division of application No. 10/527,607, filed as application No. PCT/EP03/10093 on Sep. 9, 2003, now Pat. No. 7,460,739." and insert -- Divisional of application No. 10/527,607, filed Nov. 17, 2005, now U.S. Pat. No. 7,640,739, which is a 371 application of PCT/EP03/10093, filed Sep. 9, 2003. -- therefor.

Signed and Sealed this

Twenty-first Day of September, 2010

David J. Kappos
*Director of the United States Patent and Trademark Office*